(12) United States Patent
Asakaze et al.

(10) Patent No.: US 7,182,658 B2
(45) Date of Patent: Feb. 27, 2007

(54) OUTBOARD MOTOR

(75) Inventors: Ken Asakaze, Shizuoka-ken (JP);
Aizoh Kubo, Kyoto (JP)

(73) Assignee: Yamaha Marine Kabushiki Kaisha (JP)

( * ) Notice: Subject to any disclaimer, the term of this patent is extended or adjusted under 35 U.S.C. 154(b) by 0 days.

(21) Appl. No.: 11/320,537

(22) Filed: Dec. 27, 2005

(65) Prior Publication Data

US 2006/0160441 A1   Jul. 20, 2006

(30) Foreign Application Priority Data

Dec. 27, 2004   (JP) ............................. 2004-378233

(51) Int. Cl.
*B63H 20/00* (2006.01)
(52) U.S. Cl. ...................... 440/88 L; 440/75
(58) Field of Classification Search .................. 440/75, 440/88 C, 88 L; 123/196 R, 196 W
See application file for complete search history.

(56) References Cited

U.S. PATENT DOCUMENTS 1,446,775 A * 2/1923 Wahl ........................ 440/88 L
3,647,024 A * 3/1972 Wick et al. ............. 123/196 W
5,643,025 A * 7/1997 Suzuki ........................ 440/75
5,766,047 A * 6/1998 Alexander et al. ............ 440/75

FOREIGN PATENT DOCUMENTS

JP     08-268390    10/1996
JP     2003-003844   1/2003

\* cited by examiner

*Primary Examiner*—Lars A. Olson
(74) *Attorney, Agent, or Firm*—Knobbe, Martens, Olson & Bear LLP

(57) ABSTRACT

An outboard motor engine drives an output shaft which drives a propeller shaft. The output shaft has a drive gear that engages driven gears of the propeller shaft within an oil bath for holding a lubricant for soaking the drive and driven gears. The outboard motor has an oil pump, a suction passage, and a return passage. The oil bath communicates with a suction portion of the oil pump through the suction passage, while a discharge portion of the oil pump communicates with the oil bath through a return passage. An opening of the suction passage is exposed to the oil bath and is also positioned below the drive gear.

18 Claims, 6 Drawing Sheets

OUTBOARD MOTOR

PRIORITY INFORMATION

The present application is based on and claims priority under 35 U.S.C. § 119(a–d) to Japanese Patent Application No. 2004-378233, filed on Dec. 27, 2004, the entire contents of which is expressly incorporated by reference herein.

BACKGROUND OF THE INVENTION

1. Field of the Invention

The present application generally relates to outboard motors, and more particularly to outboard motors with lubrication systems.

2. Description of the Related Art

Watercraft vehicles, such as boats, are often powered by an outboard motor having an internal combustion engine. Japanese Patent Publication No. 2003-003844 and Japanese Patent Publication No. 8-268390 disclose outboard motors that include a generally vertically extending outer casing that can be mounted on a watercraft by a bracket assembly. A power transmitting shaft often extends generally vertically through the outer casing between an internal combustion engine and a drive gear. The drive gear engages a driven gear which is fixedly attached to a propeller shaft. A lubricant can be used to lubricate the drive gear and driven gear.

When the engine operates, the engine output is often transmitted to the propeller shaft through the power transmitting shaft, the drive gear, and then the driven gear. A propeller rotates together with the propeller shaft. The watercraft thus can move forward or backward depending on the direction of rotation of the propeller shaft. The teeth of the drive gear and corresponding teeth of the driven gear are lubricated by the lubricant to reduce wearing.

Japanese Patent Publication No. 8-268390 discloses an outboard motor having an oil pump that draws lubricant in an oil bath through a suction passage. The lubricant then flows towards the engine. The drive and driven gears are completely soaked by the lubricant in the oil bath. Unfortunately, when both of the gears rotate during engine operation, each tooth of one gear leaves from a space between two teeth of the other gear, and the space is immediately filled with lubricant. On the other hand, another tooth of the former gear enters another space between two teeth of the latter gear to push out lubricant which was disposed in the space between the two teeth. Such pumping caused by the rotating gears causes a significant energy loss. These energy losses undesirably reduce the output of the outboard motor.

Additionally, because of the pumping action generated at the engaging portions of the drive and driven gears, the temperature of the lubricant rises. The elevated temperature causes a reduction of viscosity of the lubricant. The film of lubricant thus becomes relatively thin at the engaging portions of the drive and driven gears. As such, the lubrication at the engaging portions of the gears can be insufficient to effectively prevent wearing. The heating can also accelerate the deterioration of the lubricant to further reduce the effectiveness of the lubricant.

If the lubrication becomes insufficient, or the lubricant deteriorates, the surfaces of the teeth of the gears can have pitching, scuffing, spalling, abrasion, and/or the free ends of the gear teeth can have chipping. Thus, the gears can be damaged due to improper lubrication.

SUMMARY OF THE INVENTION

An aspect of at least one of the embodiments disclosed herein includes the realization that power losses between the engine and propeller shaft can be reduced while sufficiently lubricating portions of an outboard motor, such as engaging portions of a drive and driven gear.

If the outboard motor disclosed in Japanese Patent Publication No. 8-268390 is modified such that an oil pump draws lubricant from the oil bath to lower the top surface of the lubricant in the oil bath because of the time lag after the oil is sucked by the oil pump until the lubricant returns to the oil bath. Complete submersion of the gears in the lubricant may be avoided. However, an opening of the suction passage, which is exposed to the oil bath, is positioned rearwardly of the drive gear. A lower portion of the outboard motor can be slightly raised to a trim position to change a propulsive condition of the watercraft under an "operating condition" of the outboard motor. When the outboard motor moves to the trim position, the lubricant in the oil bath moves to a front portion of the oil bath. Thus, the top surface of the lubricant adjacent to the opening of the suction passage may be relatively low. As such, even though the oil pump functions, an insufficient amount of oil is drawn through the opening of the suction passage. Thus, the top surface of the lubricant may not be lowered a sufficient distance. However, lubrication systems disclosed herein can be used to effectively lubricate engine parts during various engine conditions.

In some aspects of the present invention, an outboard motor for a watercraft comprises a casing configured to be mounted on a hull of the watercraft. A propeller shaft is supported by a lower end portion of the casing. An internal combustion engine is supported by the casing. A power transmitting shaft extends generally vertically through the casing. A top end of the power transmitting shaft is coupled to the engine. A drive gear is coupled to a lower end of the power transmitting shaft. A driven gear is coupled to the propeller shaft and configured to engage the drive gear. An oil bath is configured to hold lubricant that soaks the drive gear and driven gear. An oil pump and a suction passage through which the oil bath communicates with the oil pump are provided. An opening of the suction passage is positioned below the drive gear such that lubricant in the oil bath flows through the opening into the suction passage. A return passage through which a discharge portion of the oil pump communicates with the oil bath is provided.

In other aspects of the present invention, an outboard motor for, a watercraft comprises an outer casing and a propeller shaft extending outwardly from a lower end portion of the casing. A power transmitting shaft extends downwardly from an internal combustion engine. A drive gear is coupled to a lower end of the power transmitting shaft. A driven gear is coupled to the propeller shaft and configured to engage the drive gear. A lubrication system comprises a lubricant chamber that surrounds the drive and driven gears. An oil pump and a suction passage through which the lubricant chamber communicates with the oil pump are provided. An opening of the suction passage is positioned along the lubricant chamber and is lower than the drive gear such that lubricant in the lubricant chamber flows through the opening into the suction passage. A return passage through which a discharge portion of the oil pump communicates with the lubricant chamber is provided. The driven gear includes a forward driven gear and reverse driven gear. The opening of the suction passage is interposed between at least a portion of the forward driven gear and at least a portion of the reverse driven gear when the outboard motor is in a generally upright position.

BRIEF DESCRIPTION OF THE DRAWINGS

The above-mentioned and other features of the invention disclosed herein are described below with reference to the drawings of preferred embodiments. The illustrated embodiments are intended to illustrate, but not to limit the invention. The drawings contain the following figures.

DETAILED DESCRIPTION OF THE PREFERRED EMBODIMENT

Figure 1:
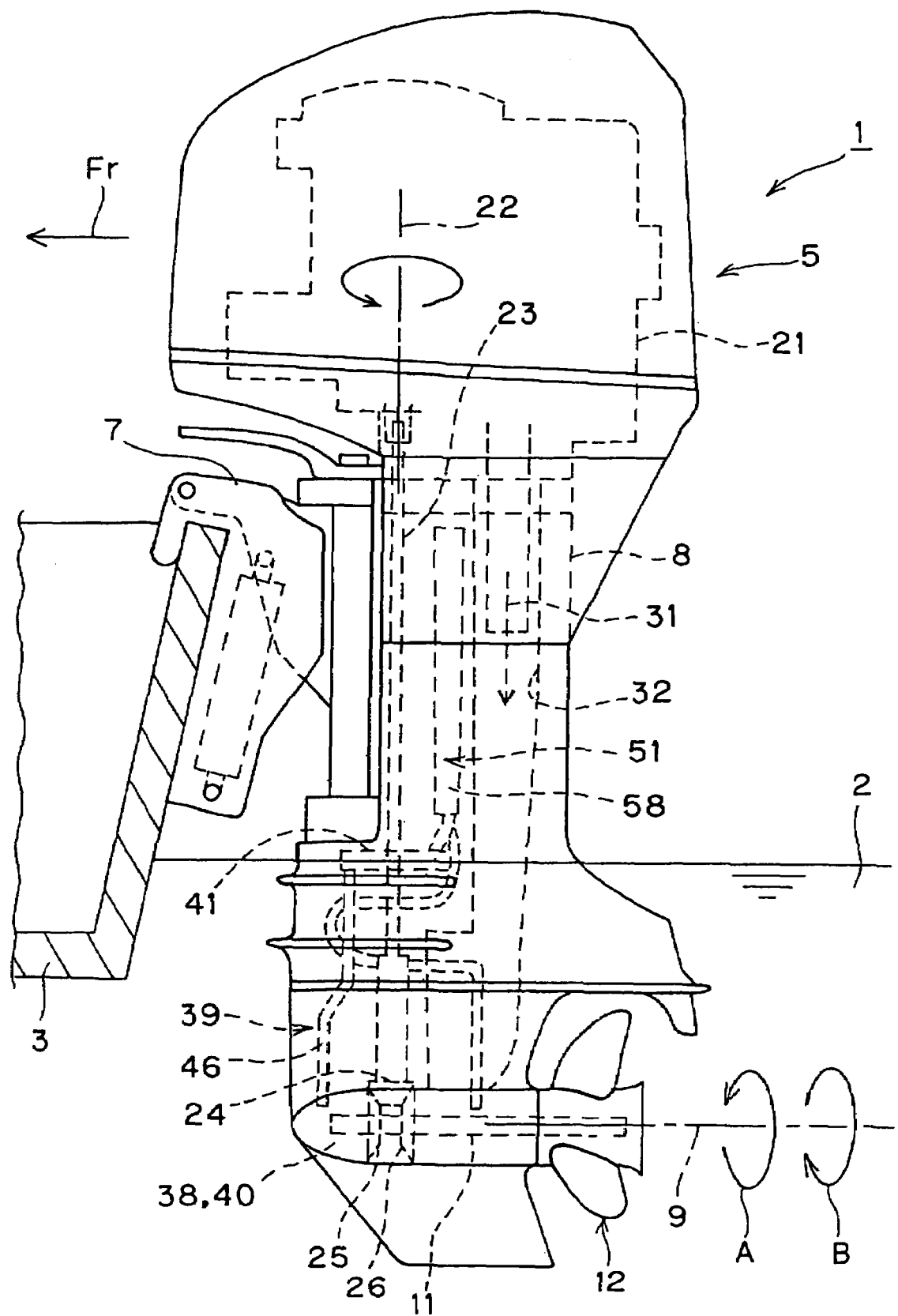
FIG. 1 is a side elevational view of an outboard motor configured in accordance with a preferred embodiment of the present invention. An associated watercraft, on which the outboard motor is mounted, is partially shown in section. Several of the internal components of the outboard motor are illustrated in phantom.

With reference to FIG. 1, a watercraft 1 has an outboard motor 5 that is configured in accordance with certain features, aspects, and advantages of the present invention. The outboard motor 5 is a typical marine drive, and thus all the embodiments below are described in the context of an outboard motor. The embodiments, however, can be applied to other marine drives, such as, for example, inboard drive and outboard drives (or stern drives), as will become apparent to those of ordinary skill in the art. The arrow FR in the drawing indicates the forward direction in which the watercraft 1 travels. The illustrated outboard motor 5 is positioned in a generally vertical orientation; however, the outboard motor 5 can occupy other positions as detailed below.

The watercraft 1 has a hull 3 floating in the water 2. The hull 3 carries the outboard motor 5, which has a propulsion unit 101 and an internal combustion engine 21 (shown in phantom). The engine 21 of the outboard motor 5 powers the propulsion unit 101. The illustrated propulsion unit 101 is a single propeller system; however, other types of propulsion units can be used as well, such as, for example, a dual counter-rotational propeller system, a jet drive, and the like. The outboard motor 5 is supported on the transom of the hull 3 by a clamp bracket 7 so as to place at least a portion of the propulsion unit 101 in a submerged position when the watercraft 1 rests in the water 2. The motor 5 is preferably steerable and/or tiltable by moving the clamp 7.

The outboard motor 5 also includes a casing 8, propeller shaft 11, and propeller 12. The casing 8 extends generally vertically. An upper portion of the casing 8 can be supported by the bracket assembly 7 for pivotal movement and a lower portion thereof is submerged under the surface of the water 2. The casing 8 can house internal components of the propulsion unit 101.

Figure 3:
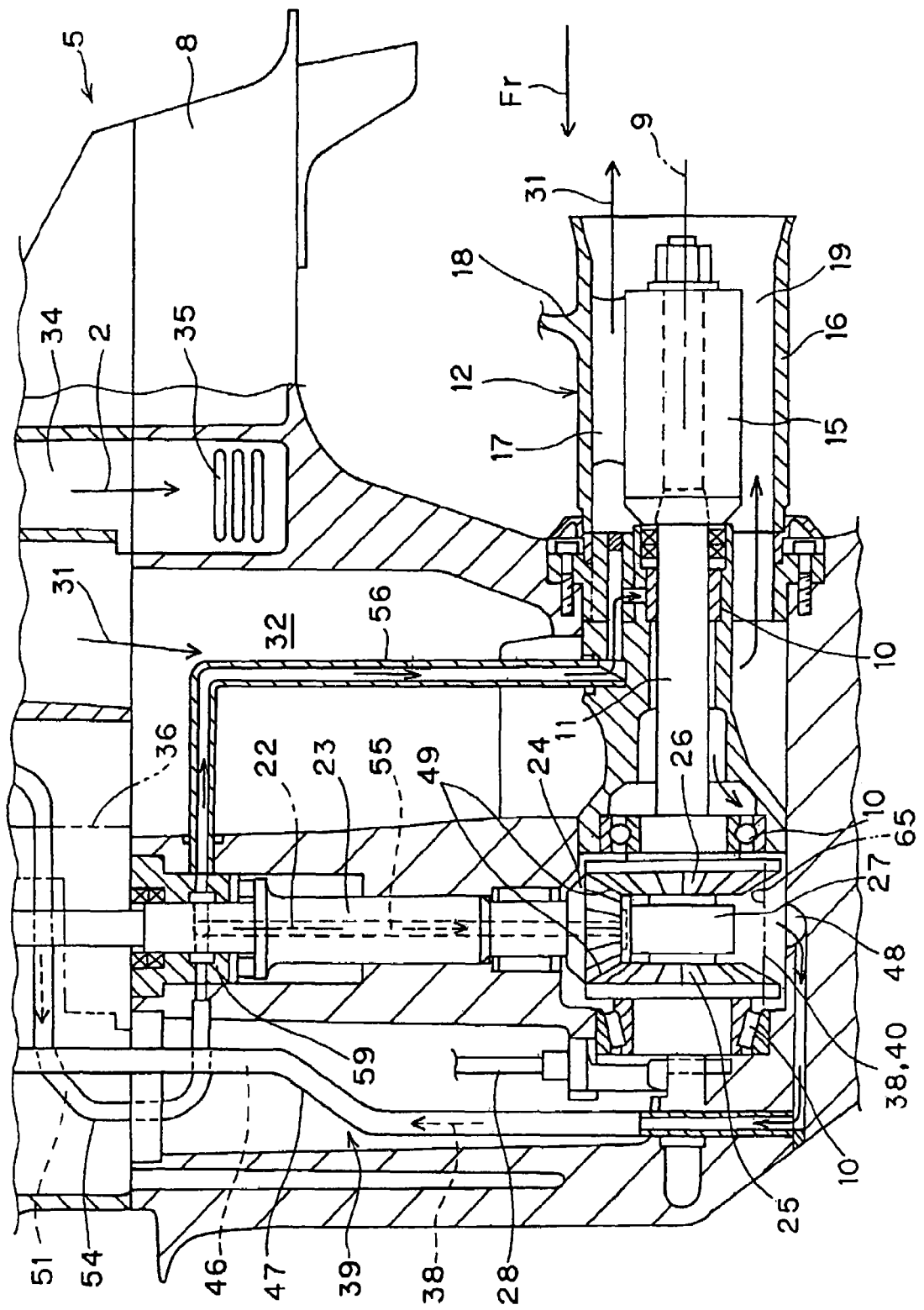
FIG. 3 is an enlarged cross-sectional view of another portion of the outboard motor of FIG. 1.

The propeller shaft 11 extends from the casing 8. When the outboard motor 5 is oriented generally vertically (see FIG. 1), the propeller shaft 11 extends generally horizontally from the casing 8. As shown in FIG. 3, the propeller shaft 11 can be journaled by one or more bearings 10 at the lower portion of the casing 8 for rotation about an axis 9. A propeller 12 preferably is fixedly coupled to a rear end of the propeller shaft 11. The illustrated outboard motor 5 has a single propeller 12; however, other types of propeller systems can be used as well, such as, for example, a dual counter-rotational propeller system.

With continued reference to FIG. 3, the propeller 12 has a boss 15, a generally cylindrical body 16, a plurality of ribs 17, and a plurality of vanes 18. The boss 15 is fixed to a rear end of the propeller shaft 11. The boss 15 and cylindrical body 16 preferably extend longitudinally along the axis 9. The cylindrical body 16 preferably surrounds the boss 15. The ribs 17 extend radially from an outer surface of the boss 15 to support the cylindrical body 16. The vanes 18 project outwardly from an outer surface of the cylindrical body 16. The propeller 12 defines a propeller passage 19 extending axially between the boss 15 and the cylindrical body 16.

The outboard motor 5 includes the internal combustion engine 21 that drives the propulsion unit 101, as mentioned above. The illustrated internal combustion engine 21 is preferably a multi-cylinder, four-cycle engine. Engines having a different number of cylinders, other cylinder arrangements, various cylinder orientations (e.g., upright cylinder banks, and V-type), and operating on various combustion principles (e.g., four stroke, crankcase compression two-stroke, diesel, and rotary) are all practicable for use with the lubricant system disclosed herein. The engine 21 comprises an engine body defining at least one cylinder bore therethrough. A cylinder head assembly is connected to the cylinder bore, and a piston is disposed within the cylinder bore. The cylinder bore, the cylinder head assembly, and the piston cooperate to define a variable combustion chamber.

Figure 2:
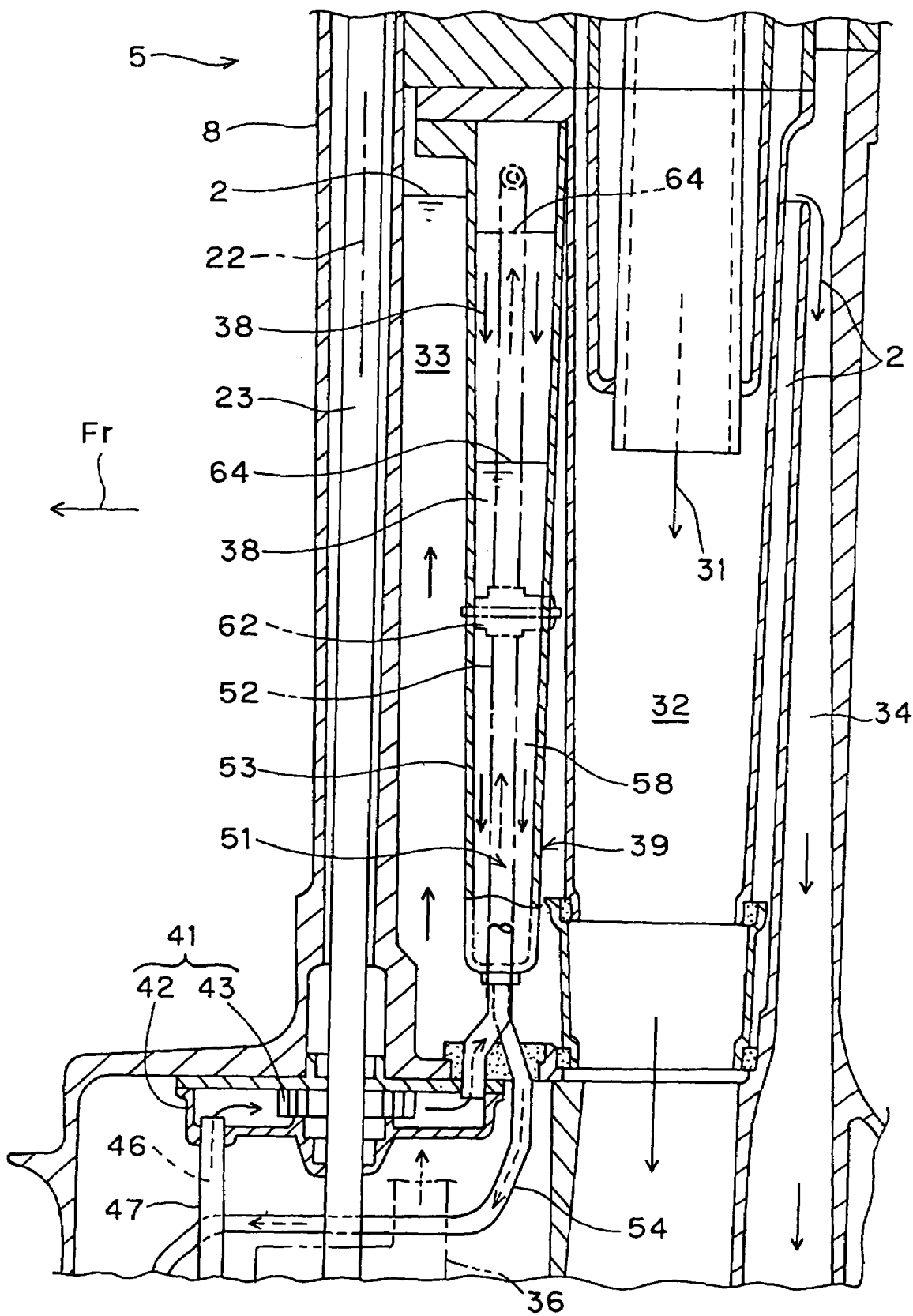
FIG. 2 is an enlarged cross-sectional view of a portion of the outboard motor of FIG. 1.

With reference to FIGS. 1 to 3, the outboard motor 5 also includes a power transmitting shaft 23, a drive gear 24, a front driven gear 25, a rear driven gear 26, a dog clutch 27, and an operating member 28. The engine 21 is mounted on a top portion of the casing 8. The power transmitting shaft 23 is supported by the casing 8 and rotatable about an axis 22 extending generally vertically. A top end of the power transmitting shaft 23 is coupled with the engine 21. When the engine 21 operates, the engine 21 can rotate the power transmitting shaft 23 about the axis 22.

With continued reference to FIGS. 1 and 3, the drive gear 24 includes a bevel gear attached to a bottom end of the power transmitting shaft 23. The front and rear driven gears 25, 26 preferably are a pair of bevel gears coupled to a front end of the propeller shaft 11. In some embodiments, the front and rear driven gears 25, 26 can pivot about the axis 9 when they engage the drive gear 24. The front driven gear 25 is space from and positioned in front of the rear driven gear 26. At least a portion of the drive gear 24 is interposed between the front and rear driven gears 25, 26. The drive gear 24 and the front and rear driven gears 25, 26 can also have other configurations.

The dog clutch 27 selectively couples either one of the driven gears 25, 26 with the propeller shaft 11 so that the coupled driven gear 25, 26 rotates with the propeller shaft 11. The clutch 27 preferably is operable by an operating force inputted from the outside through the operating member 28. Other types of clutches or transmissions can also be used based on the outboard motor design.

With reference to FIGS. 1–3, the casing 8 includes an exhaust passage 32 extending generally vertically. A bottom end of the exhaust passage 32 communicates with a front end of the passage 19 of the propeller 12. Exhaust gases 31 discharged from the engine 21 can flow downwardly through the exhaust passage 32 and into the water 2 via the passage 19.

As seen in FIG. 2, the casing 8 can have a cooling water passage 33 surrounding at least a portion of the exhaust passage 32. A water discharging passage 34 extends generally vertically next to the cooling water passage 33. A bottom end of the water discharging passage 34 communicates with the external water 2 through a water outlet 35 of the casing 8.

A water pump 36 is coupled with the power transmitting shaft 23 such that the water pump 36 is driven by the transmitting shaft 23, as shown in FIGS. 2 and 3. The water pump 36 draws in the water 2 outside of the outboard motor 5. The water pump 36 then delivers the water 2 to the engine 21 and/or to a bottom side of the cooling water passage 33. The water 2 delivered to the cooling water passage 33 preferably flows upwardly within the cooling water passage 33 to cool a portion of the casing 8 surrounding the exhaust passage 32. When the water 2 reaches a top end of the cooling water passage 33, the water 2 overflows into a top portion of the water discharging passage 34. The water 2 falls through the water discharging passage 34 and is discharged out of the outboard motor 5 via the water outlet 35. The water pump 26 can be powered by the rotation of the power transmitting shaft 23. In alternative embodiments, the water pump 26 can be powered by a motor or other suitable device.

The outboard motor 5 preferably has a lubrication system 39 for lubricating moving components of the outboard motor 5. The illustrated lubrication system 39 lubricates the bearings 10, drive gear 24, driven gears 25, 26 and/or clutch 27 using lubricant 38. The illustrated lubrication system 39 comprises an oil bath 40 and one or more oil pumps 41. The oil bath 40 preferably is defined in the lower portion of the casing 8 and configured to hold the lubricant 38. The bearings 10, drive gear 24, driven gears 25, 26 and/or the clutch 27 are soaked by the lubricant 38, as detailed below.

The lubricant 38 can be any lubricant known in the art, including but not limited to, natural lubricants, artificial lubricants, oils, or any other lubricants known in the art. In some embodiments, the lubricant includes one or more additives. The lubricant 38 can be used to lubricate various parts of the internal combustion engine 21, gears, gear systems, or other components of the outboard motor 5. In this specification, the term "oil" is used but includes other such lubricants.

As seen in FIGS. 1 and 2, the oil pump 41 is drivingly coupled with the power transmitting shaft 23. As such, the engine 21 can power the oil pump 41 via the power transmitting shaft 23, thus eliminating the need for a separate oil pump motor. Various types of oil pumps can be employed to pump the lubricant 38 through the lubrication system 39. In alternative embodiments, the oil pump 41 is powered by other powering means, as detailed below in connection with FIGS. 4 and 5.

With reference to FIG. 2, the oil pump 41 can be disposed in the casing 8 and comprises a pump case 42 and a rotor 43. The casing 8 can support the pump case 42 which houses the rotor 43. The rotor 43 is coupled to the power transmitting shaft 23. The rotor 43 and transmitting shaft 23 can rotate together about the axis 22.

The oil pump 41 is in fluid communication with the oil bath 40 via the suction passage 46. The suction passage 46 is disposed in the casing 8 and preferably extends generally vertically between the oil pump 41 and the oil bath 40.

As used herein, the term "passage" is a broad term and is used in its ordinary sense and includes, without limitation, any opening through a material through which a fluid, such as a liquid lubricant, may pass so as to act as a conduit. Passages include, but are not limited to, flexible, inflexible or partially flexible tubes, conduits, or any other structure that can act as a conduit. In the illustrated embodiment, a metallic oil conduit 47 extends generally vertically and defines a vertically extending portion of the suction passage 46. A bottom end of the oil conduit 47 preferably is in fluid communication with the oil bath 40, while a top end of the oil conduit 47 is connected to the suction port of the oil pump 41.

In some embodiments, including the illustrated embodiment of FIG. 3, an opening 48 of the suction passage 46 is positioned below engaging portions 49 of the drive gear 24 and the driven gears 25, 26. Preferably opening 48 is formed through a bottom surface of the oil bath 41. The engaging portions 49 can be the surfaces of the drive gear 24 and driven gears 25, 26 that contact each other during operation. For example, the engaging portions 49 can be formed by the teeth of the drive gear 24 mating with the teeth of one of the driven gears 25, 26.

At least a portion of the opening 48 is positioned in front of the rear driven gear 26. In the illustrated embodiment, the entire opening 48 is positioned forwardly of the rear driven gear 26. At least a portion of the opening 48 is positioned rearwardly of the front driven gear 25. In the illustrated embodiment, the entire opening 48 is positioned rearwardly of the front drive gear 25. In some embodiments, the opening 48 is positioned between the front and rear driven gears 25, 26, as shown in FIG. 3.

In the illustrated embodiment of FIG. 3, both of the gears 25, 24 are positioned in front of the rear driven gear 26. A surplus space can be defined between of the driven gears 25, 26. The distance between the driven gears 25, 26 can be selected based on the desired amount of surplus space. The lubricant 38 can accumulate in this surplus space.

The relatively large amount of the lubricant 38 per unit time can drawn by the oil pump 41 through the suction passage 46. There can be a lag between the removal of lubricant from the oil bath 40 and the delivery of lubricant into the oil bath 40. This difference in the amount of lubricant removed from and delivered to the oil bath 40 can lower the top surface 65 of the lubricant 38 in the oil bath 40. In some embodiments, the top surface 65 of the lubricant 38 can be rapidly lowered to reduce pumping action and limit temperature increases, as detailed below.

A return passage 51 extends between the oil pump 41 and the oil bath 40. A lower end of the return passage 51 is coupled to a discharge portion of the oil pump 41. The illustrated return passage 51 comprises a first, second, and third oil conduits 52, 53, 54. The first and second oil conduits 52, 53 are preferably metallic pipes positioned above the oil pump 41 and extending generally vertically and parallel to each other. The third oil conduit 54 can be a rubber tube extending from a location above the oil pump 41 to a mid portion of the power transmitting shaft 23 in its axial direction. A mid portion of the third oil conduit 54 can be positioned below the oil pump 41.

An oil aperture passage 55 (FIG. 3) extends generally vertically through a lower portion of the power transmitting shaft 23 to connect the mid portion of the power transmitting shaft 23 to the oil bath 40. The illustrated oil aperture passage 55 extends along the axis 22; however, the oil aperture passage 55 can be at other locations and orientations, if desired.

The power transmitting shaft 23 can define at least a portion of the return passage 51 between an oil stagnation portion 58 and the oil bath 40. In some embodiments, including the illustrated embodiment of FIG. 3, the power transmitting shaft 23 defines the oil aperture passage 55 extending between the nozzle portion 59 and the oil bath 40. Because a portion of the return passage 51 is formed by the power transmitting shaft 23, a separate oil conduit is not necessary for connecting the nozzle portion 59 and oil bath 40. This reduces the overall number of parts of the outboard motor 5.

A fourth oil conduit 56 provides fluid communication between the mid portion of the power transmitting shaft 23 and one or more of the bearings 10. The illustrated fourth oil conduit 56 extends rearwardly and then downwardly to one or more of the bearings 10.

A bottom end of the first oil conduit 52 is connected to the suction portion of the oil pump 41. The second oil conduit 53 surrounds the first oil conduit 52. In some embodiments, including the illustrated embodiment of FIG. 2, the first oil conduit 52 extends centrally through the second oil conduit 53. The top end of the first oil conduit 52 preferably is positioned within the top end of the first oil conduit 53.

A bottom end of the second oil conduit 53 and a top end of the third oil conduit 54 are in communication with each other. A bottom end of the third oil conduit 54 can be connected to a top end of the oil aperture passage 55 and also to a top end of the fourth oil conduit 56 in the mid portion of the power transmitting shaft 23. The first, second, third and fourth oil conduits 52, 53, 54, 56 and the oil aperture passage 55 communicate with each other directly or indirectly so as to define the return passage 51.

The return passage 51 can include the oil stagnation portion 58. The illustrated stagnation portion 58 can be used such that a return amount of the lubricant 38 per unit time returning to the oil bath 40 through the return passage 51 can be smaller than a suction amount of the lubricant 38 per unit time. That is, the volumetric flow rate of the lubricant 38 flowing out of the oil bath 40 can be greater than the volumetric flow rate of the lubricant 38 flowing into the oil bath 40.

The stagnation portion 58 is generally centrally located along the return passage 51 and holds lubricant 38. The stagnation portion 58 can have various shapes. For example, the stagnation portion 58 of FIG. 2 is defined by the outer surface of the oil conduit 52 and the inner surface of the second oil conduit 53. The oil stagnation portion 58 preferably is positioned above the oil bath 40. The lubricant 38 stagnated in the oil stagnation portion 58 can pass through the third oil conduit 54, the oil aperture passage 55 and into the fourth oil conduit 56. The oil can then flow down to the oil bath 40 by its own weight. The lubricant traveling through the fourth oil conduit 56 can lubricate the bearings 10 before flowing into the oil bath 40.

The lubricant 38 stagnates in the oil stagnation portion 58 such that the lubricant 38 can accumulate in the oil stagnation portion 58. When the oil pump 41 is first energized, the volumetric flow rate of the lubricant 38 flowing into the oil bath 40 through the return passage 51 is preferably less than the volumetric flow rate of the lubricant 38 drawn by the oil pump 41 through the suction passage 46 and, consequently, delivered to the stagnation portion 58. Accordingly, when the lubricant 38 in the oil bath 40 is drawn by the oil pump 41, the top surface 65 of the lubricant 38 in the oil bath 40 can be lowered a target distance. In some embodiments, the top surface 65 of the lubricant 38 in the oil bath 40 can be lowered below at least a portion of the engaging portions 49. In some embodiments, the top surface 65 of the lubricant 38 can be lower than a substantial portion of the engaging portions 49. As shown in FIG. 3, the top surface 65 of the lubricant 38 is lower than the engaging portions 49. In some embodiments, after top surface 65 reaches a desired position, the volumetric flow rate of the lubricant 38 returning to the oil bath 40 through the return passage 51 is generally equal to the volumetric flow rate of the lubricant 38 drawn by the oil pump 41 through the suction passage 46.

Because the oil stagnation portion 58 is higher than the oil bath 40, the lubricant 38 stagnating in the oil stagnation portion 58 can flow down to the oil bath 40 by its own weight. As such, the oil stagnation portion 58 can have a relatively simple design. The top surface 65 of the lubricant 38 in the oil bath 40 thus can be selectively lowered (e.g., lowered to a location lower than the engaging portions 49) by such a simple construction. If the outboard motor 5 is not used for an extended period time, the top surface 65 of the lubricant 38 in the oil bath 40 rises because of the lubricant 38 from the stagnation portion 58 flowing into the oil bath 40. Thus, the oil bath 40 can be partially or completely filled with the lubricant 38 when the outboard motor 5 is not used. The lubricant 38 can limit or minimize corrosion of components (e.g., gears or other components comprising iron and its alloys, such as steel) of the propulsion unit 101.

Air bubbles in the lubricant 38 can travel to the oil stagnation portion 58 by their own buoyancy. If air bubbles are in the oil bath 40, for example, the bubbles can travel through the lubricant 38 until they reach the stagnation portion 58. The bubbles can then rise through the stagnation portion 58 until they reach the surface 64. Thus, the amount of air in the lubricant 38 in the oil bath 40 can minimized. This reduces the number of air bubbles that are inserted into the engaging portions 49. The lubrication of the engaging portions 49 can therefore be properly maintained.

With reference to FIG. 3, the bottom end of the third oil conduit 54 includes a nozzle portion 59. The nozzle portion 59 can be a "T" connector that divides fluid flow from the third oil conduit 54. The nozzle portion 59 delivers a first flow to the oil aperture passage 55 and a second flow to the fourth oil conduit 56. The second oil conduit 53 can have a transverse cross sectional area which is larger than the cross sectional area of the first oil conduit 52, third oil conduit 54, oil aperture passage 55, and fourth oil conduit 56. As such, the second oil conduit 53 has a larger capacity than any one of the first oil conduit 52, third oil conduit 54, oil aperture passage 55, and fourth oil conduit 56.

The first and second oil conduits 52, 53 extend vertically through the cooling water passage 33. The cooling water 2 flowing through the cooling water passage 33 flows around a portion of the return passage 51 and cools the lubricant 38. The cooling water 2 can absorb heat from the second oil conduit 53, thereby effectively cooling the lubricant 38 within the return passage 51 a desired amount.

In some embodiments, one or more substance removing units 62 can be used to clean the lubricant 38. In the illustrated embodiment of FIG. 2, a substance removing unit 62 is positioned along a mid portion of the first oil conduit 52 and removes substances (e.g., foreign substances, contaminates, etc.) in the lubricant 38 flowing through the first oil conduit 52.

Various types of substance removing units 62 can be used to clean the lubricant 38. The illustrated substance removing unit 62 is in the form of an oil filter, and can include a casing and one or more filter elements. The casing can define an outer shell of the device 62, while the filter element(s) divide an internal cavity of the casing into upstream and downstream portions. The substance removing units 62 can be configured to remove, without limitation, metal (e.g., abrasion particles made by the mutual engagements of the respective gears 24, 25, 26), particulate, rust, and other particles that may be in the lubricant 38.

Even though foreign substances, such as abrasion particles made by the engagements of the respective gears 24, 25, 26, may be in the lubricant 38, the substance removing unit 62 can catch and remove these substances. Thus, the engaging portions 49 of the gears 24, 25, 26 do not engage these foreign substances thereby reducing wear of the engaging portions 49. The substance removing units 62 can therefore prolong the life of the outboard motor 5.

With reference to FIGS. 1 and 3, the oil bath 40 can hold the lubricant 38. As used herein, the term "oil bath" is a broad term and includes, without limitation, chambers, containers, or other suitable structures for containing the lubricant 38. The illustrated oil bath 40 is a chamber that surrounds at least a portion of the drive gear 24 and the driven gears 25, 26. The size and configuration of the oil bath 40 can be selected based on the size and configuration of the gears 24, 25, 26 and the desired lubricant holding capacity.

Under a "standstill condition" of the outboard motor 5, the engine 21 does not operate, and the lubricant 38 in the suction passage 46 and the return passage 51 flows downwardly to the oil bath 40 due to gravity. When the lubricant 38 has flowed into the oil bath 40, the top surface 64 of the lubricant 38 in the return passage 51 preferably is positioned above the engage portions 49 and at middle portions of the first and second oil conduits 52, 53 in the longitudinal directions thereof. The remainder cavity of the return passage 51 above the top surface 64 of the lubricant 38 can be an empty space.

When the engine operates 21 so that the outboard motor 5 is under an "operating condition," the engine 21 rotates the power transmitting shaft 23. The power transmitting shaft 23 drives the drive gear 24 which in turn drives at least one of the driven gears 25, 26. If the rear driven gear 26 is selected by the operating member 28 and is rotatably coupled with the propeller shaft 11, the propeller 12 rotates with the propeller shaft 11 in a right rotational direction A. The watercraft 1 thus moves forward. On the other hand, if the front driven gear 25 is selected and rotatably coupled with the propeller shaft 11, the propeller 12 rotates with the propeller shaft 11 in the reverse rotational direction B. The watercraft 1 thus moves backward.

In a beginning stage of the "operating condition" of the outboard motor 5, one or more of the gears 24, 25, 26 can be completely soaked by the lubricant 38 in the oil bath 40. The top surface 65 can be higher than the gears 24, 25, 26 so that the gears 24, 25, 26 are complete submerged in the lubricant 38. When each of the gears 24, 25, 26 is substantially or completely soaked by the lubricant 38 in the oil bath 40, the gear 24 can smoothly engage the gears 25, 26.

Under the "operating condition," the water pump 36 is powered by the rotating transmitting shaft 23. The cooling water 2 flows within the cooling water passage 33, as described above. The cooling water 2 thus cools the portion of the casing 8 around the exhaust passage 32 and the lubricant 38 in the return passage 51.

Also, under the "operating condition," the oil pump 41 is powered by the transmitting shaft 23 such that the oil pump 41 draws the lubricant 38 in the oil bath 40 through the suction passage 46. Meanwhile, the lubricant 38 drawn by the oil pump 41 returns to the oil bath 40 through the return passage 51. As such, the lubricant 38 can be circulated through the lubrication system 39.

Because lubricant 38 is held in the oil stagnation portion 58, the volumetric flow rate of the lubricant 38 returning to the oil bath 40 through the return passage 51 is less than the volumetric flow rate of the lubricant 38 sucked by the oil pump 41 through the suction passage 46, as described above. The top surface 65 of the lubricant 38 in the oil bath 40 can thus be lowered to a location lower than the engaging portions 49 of the gears 24, 25, 26.

When the top surface 65 of the lubricant 38 in the oil bath 40 is lowered, a top surface 64 of the lubricant 38 in the portion of the return passage 51 within the first and second oil conduits 52, 53 rises more than the top surface 64 under the "standstill condition" of the outboard motor 5 where the engine 21 does not operate, and preferably reaches a top portion of the return passage 51, as indicated as top surface 64' in FIG. 2.

When the engine 21 operates and keeps the outboard motor 5 under the "operating condition," the oil pump 41 preferably is driven by the engine 21. As such, the top surface 65 of the lubricant 38 in the oil bath 40 falls when the engine 21 operates, preferably lowering the surface 65 at or below the engaging surfaces 49. In this manner, the level of the lubricant 38 can rise and fall in response to the operation of the engine 21.

The oil pump 41 is driven to draw lubricant 38 in the oil bath 40 per unit time through the suction passage 46. The lubricant 38 flows through the suction passage 46 and then flows through the return passage 51 back into the oil bath 40. As such, the lubricant 38 is out of the oil bath 40 for a desired period of time as it travels through the suction passage 46 and the return passage 51. Because of this time lag, the top surface 65 of the lubricant 38 in the oil bath 40 can be lowered when the oil pump 41 operates.

The gears 24, 25, 26 are therefore not completely soaked in the lubricant 38. When the output of the engine 21 is transmitted to the propeller shaft 11, the pumping action at the engaging portions 49 of the gears 24, 25, 26 is reduced in comparison to when gears are wholly soaked. Accordingly, power losses due to pumping action created by the gears 24, 25, 26 can be minimized.

The temperature of the lubricant 38 can also be maintained below a desired temperature. The viscosity of the lubricant 38 is maintained above a desired viscosity, and the oil film at the engaging portions 49 of the respective gears 24, 25, 26 thus does not become excessively thin. Accordingly, the lubricant 38 can effectively lubricate the engaging portions 49. Additionally, the lubricant 38 does not deteriorate because the rise of the temperature of the lubricant 38 is limited.

When the outboard motor 5 is raised to the trim position under the "operating condition" of the outboard motor 5 that is powered by the engine 21, the lubricant 38 in the oil bath 40 moves to a front portion of the oil bath 40. The top surface 65 of the lubricant 38 on the rear side of the oil bath 40 can be relatively low. However, one or more of the gears 24, 25, 26 can be maintained under the partially or completely soaked condition by the lubricant 38.

As described above, the opening 48 of the suction passage 46 exposed to the oil bath 40 is positioned lower than the drive gear 24 as viewed from the side, as shown in FIG. 3. The oil pump 41 draws a portion of the lubricant 38 below the drive gear 24 through the opening 48 into the suction passage 46. The top surface 65 of the lubricant 38 can be lowered below the engaging portions 49 of the respective gears 24, 25, 26, if desired. As such, pump action and temperature increases can be reduced or minimized. Thus, the proper lubrication can be maintained even when the outboard motor 1 is in various positions.

The oil pump 41 preferably pressurizes the lubricant 38 in the return passage 51. In the illustrated embodiment, the oil pump 41 is positioned upstream of the return passage 51. Because the lubricant 38 is pressurized, it can be at a relatively high temperature. The cooling water 2 can advantageously flow around the return passage 51 to reduce the temperature of the lubricant 38 as desired.

The lubricant 38 in the return passage 51 can thus be effectively cooled by the water 2. Accordingly, the temperature of the lubricant 38 can be maintained in a target temperature operating range. One of ordinary skill in the art can select the desired temperature for the lubricant 38 to maintain the desired oil viscosity. As such, the lubricant 38 can have a relatively high viscosity to ensure proper lubrication of the engaging portions 49 of the gears 24, 25, 26.

Additionally, cooling water 2 that cools the lubricant 38 can also cool the casing 8 around the exhaust passage 34. Because of the multiple uses of the cooling water 2, the cooling structure of the lubricant 38 can simplified.

When the engine 21 stops operating, the outboard motor 5 returns to the "standstill condition." The top surface 65 can rise while the top surface 64 is correspondingly lowered. The lubricant 38 thus returns to the standstill condition detailed above.

Figure 4:
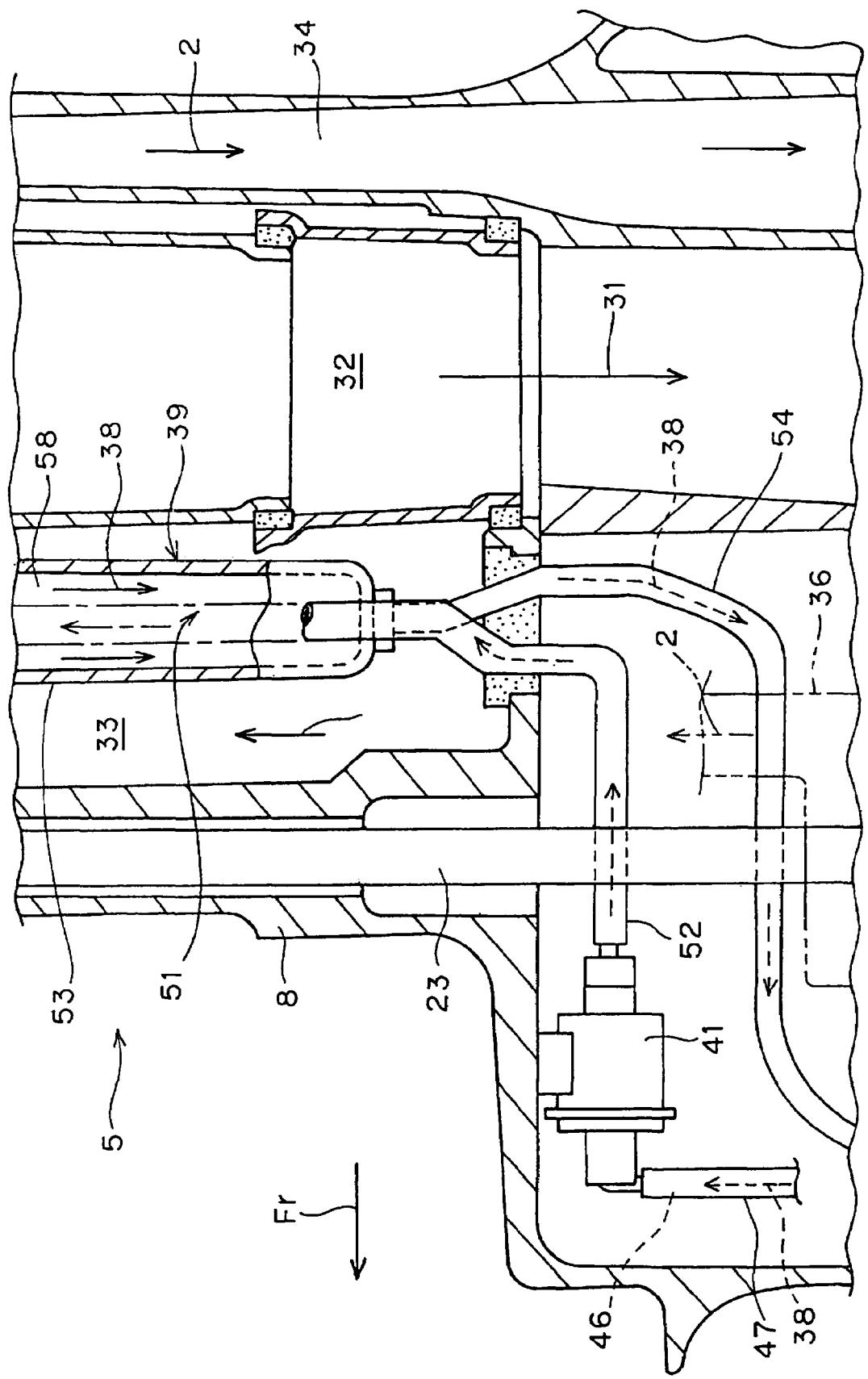
FIG. 4 is a cross-sectional view of a portion of an outboard motor in accordance with another embodiment, corresponding to the portion of the outboard motor illustrated in FIG. 2.
Figure 5:
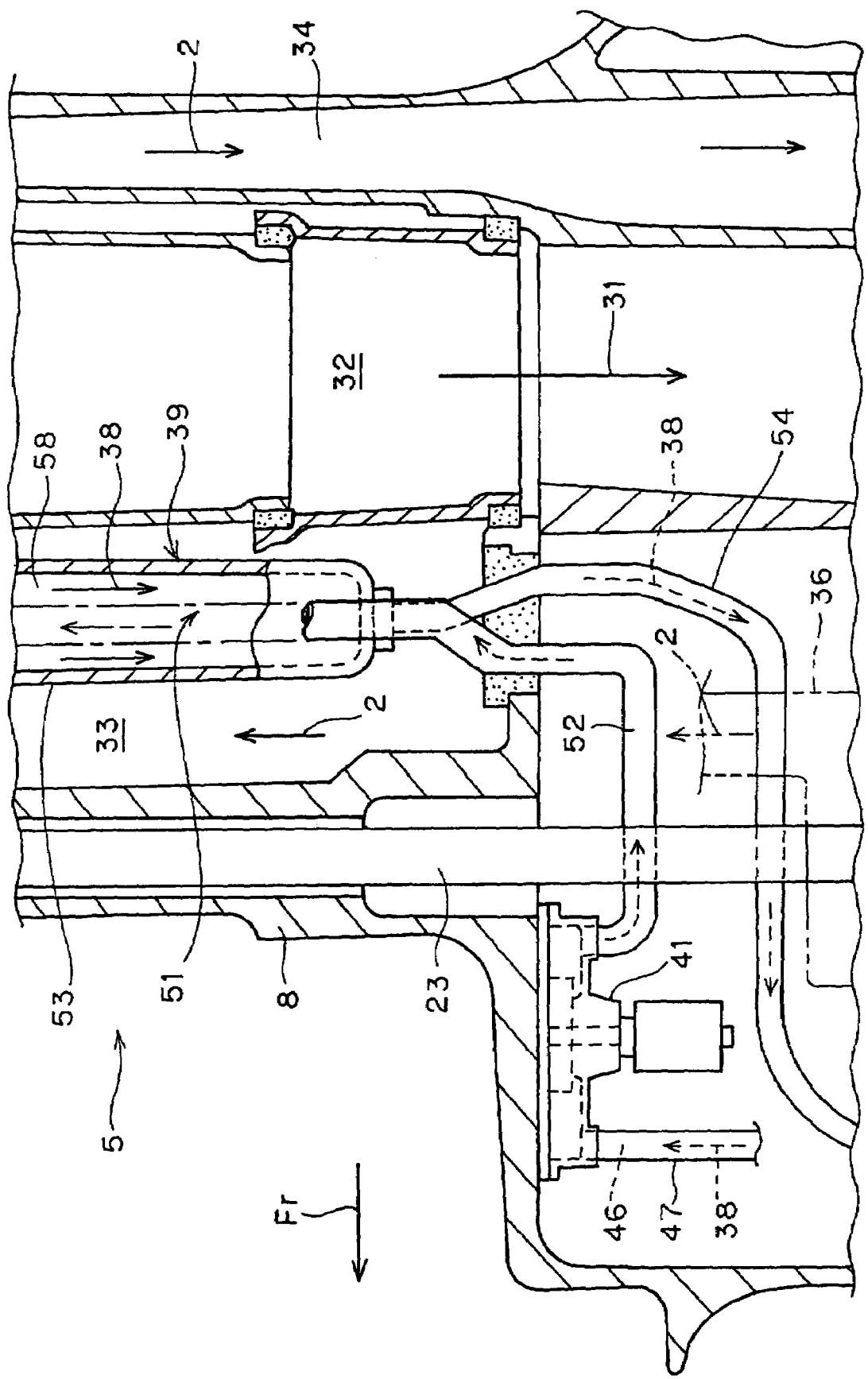
FIG. 5 is a cross-sectional view of a portion of an outboard motor in accordance with another embodiment, corresponding to the portion of the outboard motor illustrated in FIG. 2.
Figure 6:
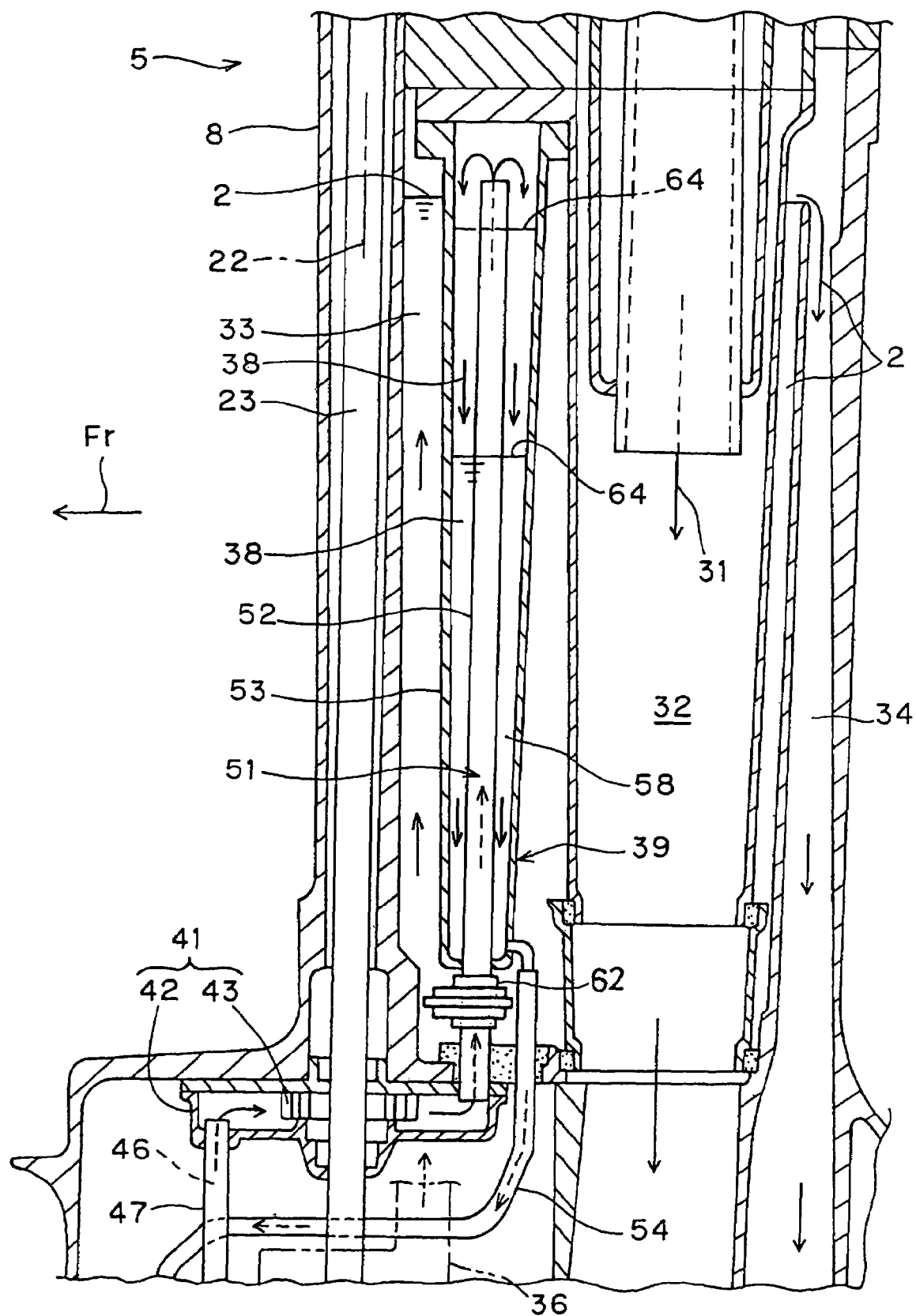
FIG. 6 is a cross-sectional view of a portion of an outboard motor in accordance with another embodiment, corresponding to the portion of the outboard motor illustrated in FIG. 2

FIGS. 4 through 6 illustrate portions of outboard motors in accordance with other embodiments, which may be generally similar to the embodiment illustrated in FIGS. 1 to 3, except as further detailed below. The skilled artisan will recognize the interchangeability of various features from different embodiments disclosed herein.

FIG. 4 illustrates an electric oil pump 41. The oil pump 41 can be operated dependently or independently of the engine 21. In some embodiments, the output of the oil pump 41 can be independent of the speed of the engine 21. In such embodiments, the amount of the lubricant 38 drawn from the oil bath 40 per unit time can be desirably changed independently of the output of the engine 21. Accordingly, the top surface 65 of the lubricant 38 can be selectively raised and lowered. During engine operation, for example, the top surface 65 can be rapidly lowered to the location lower than the engaging portions 49.

The oil pump 41 can be powered by any suitable power source. For example, the oil pump 41 can be powered by a battery or other power storage device. Alternatively, the oil pump 41 can be powered by an alternator or other power generation device that is driven by the engine 21.

In some embodiments, one or more sensors can detect the level of the lubricant 38 and send a signal indicative of the detected level. The signal(s) from the sensor(s) can be used to determine whether the oil pump 41 operates or stops. Thus, the oil pump 41 can be controlled based upon one or more signals from at least one sensor so that the top surface 65 of the lubricant 38 can be maintained at a desired level.

FIG. 5 illustrates an electrical oil pump 41 in accordance with another embodiment. The illustrated oil pump 41 is a pump operated by an electric motor 103. The electric motor 103 is coupled to a rotor 105 that is within a housing 111. The oil pump 41 can be operated dependently or independently of the engine 21. The oil pump 41 is spaced from the shaft 23. In some embodiments, including the illustrated embodiment, the oil pump 41 is mounted to the inner surface of the casing 8. The oil pump 41 can also be mounted at other suitable locations.

With reference to FIG. 6, the first and second oil conduits 52, 53 together form a double walled structure. The first oil conduit 52 extends vertically within the second oil conduit 53. The substance removing unit 62 can be positioned upstream or downstream of the oil stagnation portion 58 formed by the first oil conduit 52 and the second oil conduit 53. The illustrated substance removing unit 62 is interposed between the second oil conduit 53 and the oil pump 41. However, the substance removing unit 62 can also be other locations.

The illustrated lubrication systems 39 can have any number of substance removing units 62. For example, the outboard motors 5 illustrated in FIGS. 2 and 6 have a single substance removing unit 62. In alternatively embodiments, the outboard motor 5 can have two, three, or any number of substance removing units positioned along the lubrication system.

A skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. In any of these applications, the engine 15 can be oriented vertically, horizontally or otherwise disposed. Accordingly, it is not intended that the invention be limited, except as by the appended claims.

What is claimed is:

1. An outboard motor for a watercraft, the outboard motor comprising a casing configured to be mounted on a hull of the watercraft, a propeller shaft supported by a lower end portion of the casing, an internal combustion engine supported by the casing, a power transmitting shaft extending generally vertically through the casing, a top end of the power transmitting shaft being coupled to the engine, a drive gear being coupled to a lower end of the power transmitting shaft, a driven gear being coupled to the propeller shaft and configured to engage the drive gear, an oil bath configured to hold lubricant that soaks the drive gear and driven gear, an oil pump and a suction passage through which the oil bath communicates with the oil pump, an opening of the suction passage being positioned below the drive gear such that lubricant in the oil bath flows through the opening into the suction passage, and a return passage through which a discharge portion of the oil pump communicates with the oil bath.

2. The outboard motor of claim 1, wherein the driven gear includes a forward driven gear and reverse driven gear, one of the driven gears is positioned in front of the other one of the driven gears, and the opening of the suction passage is positioned in front of at least one of the driven gears.

3. The outboard motor of claim 2, wherein the opening of the suction passage is positioned forwardly of the rearmost driven gear.

4. The outboard motor of claim 2, wherein the opening of the suction passage is interposed between the forward driven gear and reverse driven gear.

5. The outboard motor of claim 1, wherein the return passage has an oil stagnation portion in which the lubricant stagnates so that a return amount of the lubricant per unit time that returns to the oil bath through the return passage is less than a suction amount of the lubricant per unit time that is drawn by the oil pump through the suction passage.

6. The outboard motor of claim 5, wherein the oil stagnation portion is positioned higher than the oil bath so that the lubricant in the oil stagnation portion flows downwardly to the oil bath due to gravitational forces.

7. The outboard motor of claim 5, wherein at least a portion of the return passage between the oil stagnation portion and the oil bath is defined by the power transmitting shaft.

8. The outboard motor of claim 1, further comprising a cooling water passage that surrounds at least a portion of the return passage such that cooling water flowing in the cooling water passage flows around the return passage.

9. The outboard motor of claim 1, further comprising at least one substance removing unit for removing one or more substances in the lubricant.

10. The outboard motor of claim 1, wherein the oil pump is coupled with the power transmitting shaft such that the power transmitting shaft powers the oil pump.

11. The outboard motor of claim 1, wherein the oil pump is an electrical oil pump.

12. The outboard motor of claim 11, wherein the oil pump operates independently of the internal combustion engine.

13. An outboard motor for a watercraft, the outboard motor comprising an outer casing and a propeller shaft extending outwardly from a lower end portion of the casing, a power transmitting shaft extending downwardly from an internal combustion engine, a drive gear being coupled to a lower end of the power transmitting shaft, a driven gear being coupled to the propeller shaft and configured to engage the drive gear, a lubrication system comprising a lubricant chamber that surrounds the drive and driven gears, an oil pump and a suction passage through which the lubricant chamber communicates with the oil pump, an opening of the suction passage is positioned along the lubricant chamber and is lower than the drive gear such that lubricant in the lubricant chamber flows through the opening into the suction passage, the driven gear includes a forward driven gear and reverse driven gear, and the opening of the suction passage is interposed between at least a portion of the forward driven gear and at least a portion of the reverse driven gear when the outboard motor is in a generally upright position, and a return passage through which a discharge portion of the oil pump communicates with the lubricant chamber.

14. The outboard motor of claim 13, wherein the opening of the suction passage is positioned lower than the driven gear.

15. The outboard motor of claim 14, wherein the opening is formed through a bottom surface of the lubricant chamber.

16. The outboard motor of claim 13, wherein the return passage has an oil accumulation portion in which the lubricant accumulates, the return passage and suction passage configured so that during a portion of operation a volumetric flow rate of the lubricant that is delivered into the lubricant chamber through the return passage is less than a volumetric flow rate of the lubricant that is drawn by the oil pump through the suction passage when the engine operates.

17. The outboard motor of claim 16, wherein the lubricant in the oil accumulation portion flows downwardly to the lubricant chamber due to gravitational forces.

18. The outboard motor of claim 17, wherein the lubricant substantially fills the lubricant chamber when the engine is not operating.

* * * * *